United States Patent
Chang et al.

(10) Patent No.: US 11,689,710 B2
(45) Date of Patent: Jun. 27, 2023

(54) IMAGE PROCESSING DEVICE, IMAGE PROCESSING METHOD AND 3D IMAGE GENERATION SYSTEM

(71) Applicant: Coretronic Corporation, Hsin-Chu (TW)

(72) Inventors: Hsin-Yueh Chang, Hsin-Chu (TW); Li-Ming Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/707,990

(22) Filed: Mar. 30, 2022

(65) Prior Publication Data
US 2022/0321869 A1 Oct. 6, 2022

(30) Foreign Application Priority Data
Mar. 31, 2021 (TW) .................................. 110111820

(51) Int. Cl.
*H04N 13/395* (2018.01)
*H04N 13/398* (2018.01)
(Continued)

(52) U.S. Cl.
CPC ......... *H04N 13/395* (2018.05); *H04N 13/156* (2018.05); *H04N 13/161* (2018.05);
(Continued)

(58) Field of Classification Search
CPC .. H04N 13/395; H04N 13/156; H04N 13/161; H04N 13/178; H04N 13/194; H04N 13/398; H04N 2013/0081; H04N 13/322; H04N 23/667; H04N 23/67; H04N 23/69; H04N 23/951; G02B 15/14
See application file for complete search history.

(56) References Cited

U.S. PATENT DOCUMENTS

| 2,906,171 | A | 9/1959 | Bergstein | |
| 10,310,450 | B2 * | 6/2019 | Falkenberg | .......... G03H 1/0443 |

(Continued)

FOREIGN PATENT DOCUMENTS

| CN | 106233189 | 12/2016 |
| CN | 108663799 | 10/2018 |

*Primary Examiner* — Michael Lee
(74) *Attorney, Agent, or Firm* — JCIPRNET

(57) ABSTRACT

An image processing device, including an image generation circuit and a multifocal length processing circuit, is provided. The image generation circuit generates multiple depth plane images with depth information and multiple corresponding zoom control information, and merges the multiple depth plane images and the multiple zoom control information according to an arrangement rule, to be a merged image data. The multifocal length processing circuit is configured to decompose the merged image data to restore the multiple depth plane images and the corresponding multiple zoom control information according to the arrangement rule, and to determine a time at which the restored multiple depth plane images are transmitted to a display device and a time at which the restored multiple zoom control information are transmitted to a zoom lens according to a frame rate of the display device. The disclosure also provides an image processing method and a 3D image generation system.

22 Claims, 6 Drawing Sheets

(51) Int. Cl.
*H04N 13/194* (2018.01)
*H04N 13/178* (2018.01)
*H04N 13/161* (2018.01)
*H04N 13/156* (2018.01)
*G02B 15/14* (2006.01)

(52) U.S. Cl.
CPC ......... *H04N 13/178* (2018.05); *H04N 13/194* (2018.05); *H04N 13/398* (2018.05); *G02B 15/14* (2013.01)

(56) References Cited

U.S. PATENT DOCUMENTS

| | | | |
|---|---|---|---|
| 10,448,030 B2* | 10/2019 | Graziosi | G06T 9/20 |
| 11,106,052 B2* | 8/2021 | Navarro Fructuoso | G02B 27/0075 |
| 11,601,637 B2* | 3/2023 | Boev | G02B 3/14 |
| 2012/0113092 A1 | 5/2012 | Bar-Zeev et al. | |
| 2014/0320656 A1* | 10/2014 | Foley | G06V 20/56 |
| | | | 348/148 |
| 2016/0148416 A1* | 5/2016 | Wu | H04N 13/395 |
| | | | 345/419 |
| 2016/0173883 A1* | 6/2016 | Lawrence | H04N 19/117 |
| | | | 348/46 |
| 2017/0358136 A1 | 12/2017 | Gollier et al. | |
| 2019/0146663 A1* | 5/2019 | Kyusojin | G16H 30/20 |
| | | | 715/781 |
| 2020/0160811 A1* | 5/2020 | Boev | G09G 3/3607 |
| 2020/0259995 A1* | 8/2020 | Ito | G06F 3/04817 |
| 2021/0103160 A1* | 4/2021 | Dehkordi | H04N 23/75 |
| 2021/0144360 A1* | 5/2021 | Boev | H04N 13/322 |
| 2021/0185303 A1* | 6/2021 | Valli | H04N 13/398 |
| 2021/0218940 A1* | 7/2021 | Xiao | G02B 30/52 |
| 2021/0364817 A1* | 11/2021 | Bhagavatula | G06F 3/147 |
| 2023/0073991 A1* | 3/2023 | Miller, IV | G06T 13/40 |
| 2023/0076388 A1* | 3/2023 | Yan | G02B 27/0101 |
| 2023/0077212 A1* | 3/2023 | Zou | G02B 30/50 |

* cited by examiner

IMAGE PROCESSING DEVICE, IMAGE PROCESSING METHOD AND 3D IMAGE GENERATION SYSTEM

CROSS-REFERENCE TO RELATED APPLICATION

This application claims the priority benefit of Taiwan application serial no. 110111820, filed on Mar. 31, 2021. The entirety of the above-mentioned patent application is hereby incorporated by reference herein and made a part of this specification.

BACKGROUND

Technical Field

This disclosure relates to relates to an image processing device, and in particular to an image processing device that processes 3D images.

Description of Related Art

Currently, in the 3D image generation technology, the human eye may focus on any virtual object in a virtual environment after an image generated by a virtual environment system comes into the retina. However, each virtual object does not emit light with a degree of divergence corresponding to its location. This phenomenon violates physiology of vision and leads to vergence-accommodation conflict, which causes people to feel dizzy and nauseous.

In response to this issue, a display panel capable of zooming may perform refraction through a multi-focal lens when presenting display planes of different depths, so as to alleviate the vergence-accommodation conflict. Specifically, an existing multi-focus display system uses a computer graphics engine (such as Unity) to generate images of different depth levels, stores images of the different depth levels by layers into individual depth planes to encode. Subsequently, they are transmitted to a processor for decoding through a channel of a transmission interface by a display card, so as to retrieve individual depth plane images and depth control information. The processor transmits the depth control information to a multi-focal length display driving unit, so as to control a focal length of the multi-focal lens. Concurrently, the processor transmits the synchronized depth plane images to an organic light-emitting diode (OLED) panel for display.

For the multi-focus display system, transmission of data is mostly preset as a frame (or multiple frames) of image data including a sub-image of a three-dimensional scene, and the sub-image of the three-dimensional scene are sequentially transmitted. Smoothness of the display image has to be maintained and correctness of display content has to be ensured during transmission. Therefore, accuracy and error tolerance of the image data transmission between various units of the multi-focus display system are very important.

In detail, an image generation unit of the multi-focus display system may have abnormal display content due to the following reasons, such as unable to complete sub-image processing of the 3D scene being in time (for example, due to the processing speed not being fast enough), an insufficient transmission rate, and the image generation unit transmitting the data content at an incorrect time. The above-mentioned problems have a great negative impact on the user experience.

Therefore, it is necessary to propose a solution that takes into account correctness of the transmitted data content and ensures fluency of the image.

The information disclosed in this background section is only for enhancement of understanding of the background of the described technology and therefore it may contain information that does not form the prior art that is already known to a person of ordinary skill in the art. Furthermore, the information disclosed in the background section does not mean that one or more problems to be resolved by one or more embodiments of the invention were acknowledged by a person of ordinary skill in the art.

SUMMARY

This disclosure provides an image processing device, an image processing method, and a 3D image generation system, which can ensure correctness of transmitted data content and takes into account fluency of a display image in a limited bandwidth.

Other advantages of the disclosure may be further understood from technical features disclosed in the disclosure.

An embodiment of the disclosure provides an image processing device. The image processing device is coupled to a display device and a zoom lens. The image processing device includes an image generation circuit and a multifocal length processing circuit. The image generation circuit is configured to generate multiple depth plane images with depth information, and multiple zoom control information respectively corresponding to the multiple depth plane images. The image generation circuit merges the multiple depth plane images and the multiple zoom control information according to an arrangement rule, so as to generate a merged image data. The multifocal length processing circuit is configured to decompose the merged image data according to the arrangement rule, so as to restore the multiple depth plane images and the corresponding multiple zoom control information. The multifocal length processing circuit is further configured to determine a time at which the restored multiple depth plane images are transmitted to the display device and a time at which the restored multiple zoom control information are transmitted to the zoom lens according to a frame rate of the display device.

According to an embodiment of the disclosure, the image generation circuit and the multifocal length processing circuit generate the merged image data and decompose the merged image data according to a first arrangement rule when the image processing device is operating in a high-resolution mode. The image generation circuit and the multifocal length processing circuit generate the merged image data and decompose the merged image data according to a second arrangement rule when the image processing device is operating in a low-resolution mode.

According to an embodiment of the disclosure, the image generation circuit is configured to merge two sets of depth planes images with different depth information when the image processing device is operating in a high-resolution mode. Each set of the two sets of depth plane images includes two depth plane images respectively corresponding to a left eye and a right eye.

According to an embodiment of the disclosure, the image generation circuit is configured to merge four sets of depth planes images with different depth information when the image processing device is operating in a low-resolution mode. Each set of the four sets of depth plane images includes two depth plane images respectively corresponding to a left eye and a right eye.

According to an embodiment of the disclosure, the image generation circuit is configured to replace at least one least significant bit of a portion of pixels of each of the depth plane images with zoom control information corresponding to each of the depth plane images, thereby merging the multiple depth plane images and the multiple zoom control information.

According to an embodiment of the disclosure, the image generation circuit is configured to write the multiple zoom control information into a vertical blank interval between the multiple depth plane images, thereby merging the multiple depth plane images and the multiple zoom control information.

According to an embodiment of the disclosure, the image generation circuit is configured to respectively calculate multiple error correction codes corresponding to the multiple zoom control information according to the multiple zoom control information, so as to incorporate the multiple error correction codes into the merged image data. The multifocal length processing circuit is configured to respectively perform error correction on the multiple zoom control information which are restored according to the multiple error correction codes after decomposing the merged image data, so as to ensure correctness of the multiple zoom control information which are restored.

According to an embodiment of the disclosure, the multiple error correction codes are BCH codes.

According to an embodiment of the disclosure, the multifocal length processing circuit of the image processing device includes a segmentation circuit. The segmentation circuit is configured to segmentalize the merged image data into N equal parts in a vertical scanning direction and segmentalize the merged image data into M equal parts in a horizontal scanning direction according to the arrangement rule, so as to restore the multiple depth plane images and the multiple zoom control information corresponding to the multiple depth plane images. Both N and M are natural numbers.

According to an embodiment of the disclosure, the multifocal length processing circuit of the image processing device includes a dynamic prediction module. A prediction is performed on N depth plane images before an abnormal depth plane image in a transmission sequence according to a pre-built prediction model when the abnormal depth plane image that is to be transmitted to the display device, and the abnormal depth plane image is replaced with a prediction result and the prediction result is transmitted to the display device.

According to an embodiment of the disclosure provides an image processing method. The image processing method is suitable for an image processing device. The image processing device is coupled to a display device and a zoom lens. The image processing method includes the following steps. Multiple depth plane images with depth information and multiple zoom control information respectively corresponding to the multiple depth plane images are generated by an image generation circuit in the image processing device. The multiple depth plane images and the multiple zoom control information are merged by the image generation circuit according to an arrangement rule, so as to generate a merged image data. The merged image data is decomposed by a multifocal length processing circuit in the image processing device according to the arrangement rule, so as to restore the multiple depth plane images and the multiple zoom control information corresponding to the multiple depth plane images. And, a time at which the multiple depth plane images which are restored are transmitted to the display device and a time at which the multiple zoom control information which are restored are transmitted to the zoom lens are determined by the multifocal length processing circuit according to a frame rate of the display device.

According to an embodiment of the disclosure, the image processing method includes the following steps. The image generation circuit and the multifocal length processing circuit are enabled to generate the merged image data and decompose the merged image data according to a first arrangement rule when the image processing device is operating in a high-resolution mode. In addition, the image generation circuit and the multifocal length processing circuit are enabled to generate the merged image data and decompose the merged image data according to a second arrangement rule when the image processing device is operating in a low-resolution mode.

According to an embodiment of the disclosure, the image processing method includes merging two sets of depth plane images with different depth information by the image generation circuit when the image processing device is operating in a high-resolution mode, in which each set of the two sets of depth plane images includes two depth plane images respectively corresponding to a left eye and a right eye.

According to an embodiment of the disclosure, the image processing method includes merging four sets of depth planes images with different depth information by the image generation circuit when the image processing device is operating in a low-resolution mode, in which each set of the four sets of depth plane images includes two depth plane images respectively corresponding to a left eye and a right eye.

According to an embodiment of the disclosure, the image processing method includes replacing at least one least significant bit of a portion of pixels of each of the depth plane images with zoom control information corresponding to each of the depth plane images by the image generation circuit, thereby merging the multiple depth plane images and the multiple zoom control information.

According to an embodiment of the disclosure, the image processing method includes writing the multiple zoom control information into a vertical blank interval between the multiple depth plane images by the image generation circuit, thereby merging the multiple depth plane images and the multiple zoom control information.

According to an embodiment of the disclosure, the image processing method includes the following steps. Multiple error correction codes corresponding to the multiple zoom control information are respectively calculated by the image generation circuit according to the multiple zoom control information, so as to be incorporated into the merged image data. In addition, the merged image data is decomposed and error correction is respectively performed on the multiple zoom control information which are restored by the multifocal length processing circuit according to the multiple error correction codes, so as to ensure correctness of the multiple zoom control information which are restored.

According to an embodiment of the disclosure, the multiple error correction codes in the image processing method are BCH codes.

According to an embodiment of the disclosure, the image processing method includes segmentalizing the merged image data into N equal parts in a vertical scanning direction and segmentalizing the merged image data into M equal parts in a horizontal scanning direction by a segmentation circuit in the multifocal length processing circuit according to the arrangement rule, thereby restoring the multiple depth plane images and the multiple zoom control information corresponding to the multiple depth plane images, where N and M are both natural numbers.

According to an embodiment of the disclosure, the image processing method includes the following steps. A prediction is performed on N depth plane images before an abnormal depth plane image in a transmission sequence by a dynamic prediction module in the multifocal length processing circuit according to a pre-built prediction model when the abnormal depth plane image that is to be transmitted to the display device, so as to generate a prediction result. And, the abnormal depth plane image is replaced with the prediction result and the prediction result is transmitted to the display device by the multifocal length processing circuit.

An embodiment of the disclosure provides a 3D image generation system. The 3D image generation system includes the image processing device, the display device, and the zoom lens. The display device is coupled to the image processing device, and is configured to display the multiple depth plane images which are restored. The zoom lens is coupled to the image processing device, and is configured to change a focal length according to the multiple zoom control information which are restored.

According to an embodiment of the disclosure, in the 3D image generation system, the multiple depth plane images which are restored are formed by multiple sets of depth plane images with different depth information. Each set of depth plane images includes two depth plane images respectively corresponding to a left eye and a right eye. The multifocal length processing circuit is further configured to simultaneously transmit the two depth plane images in a same set to the display device and simultaneously transmit the two zoom control information corresponding to the two depth plane images to the zoom lens.

Based on the above, the embodiments of the disclosure have at least one of the following advantages. In the disclosure, the merged image data containing the multiple depth plane images and the multiple zoom control information corresponding to the multiple depth plane images are transmitted by the image generation circuit, and the merged image data is decomposed through the multifocal length processing circuit, so as to obtain the multiple depth plane images and the multiple zoom control information corresponding to the multiple depth plane images. Since the multiple depth plane images and the multiple zoom control information corresponding to the multiple depth plane images are transmitted one-time, the disclosure can prevent the transmitted data content from being incorrect due to factors such as the processing speed and the transmission rate. At the same time, it can also accurately determine the time at which each of the depth plane images is transmitted to the display device and each of the zoom control information is transmitted to the zoom lens, so as to ensure the fluency of the image.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the descriptions, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top", "bottom", "front", "back" etc., is used with reference to the orientation of the figure(s) being described. The components of the present invention can be positioned in a number of different orientations. As such, the directional terminology is used for purposes of illustration and is in no way limiting. On the other hand, the drawings are only schematic and the size of the components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

It is to be understood that other embodiment may be utilized and structural changes may be made without departing from the scope of the present invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted," and variations thereof herein are used broadly and encompass direct and indirect connections, couplings, and mountings.

Figure 1:
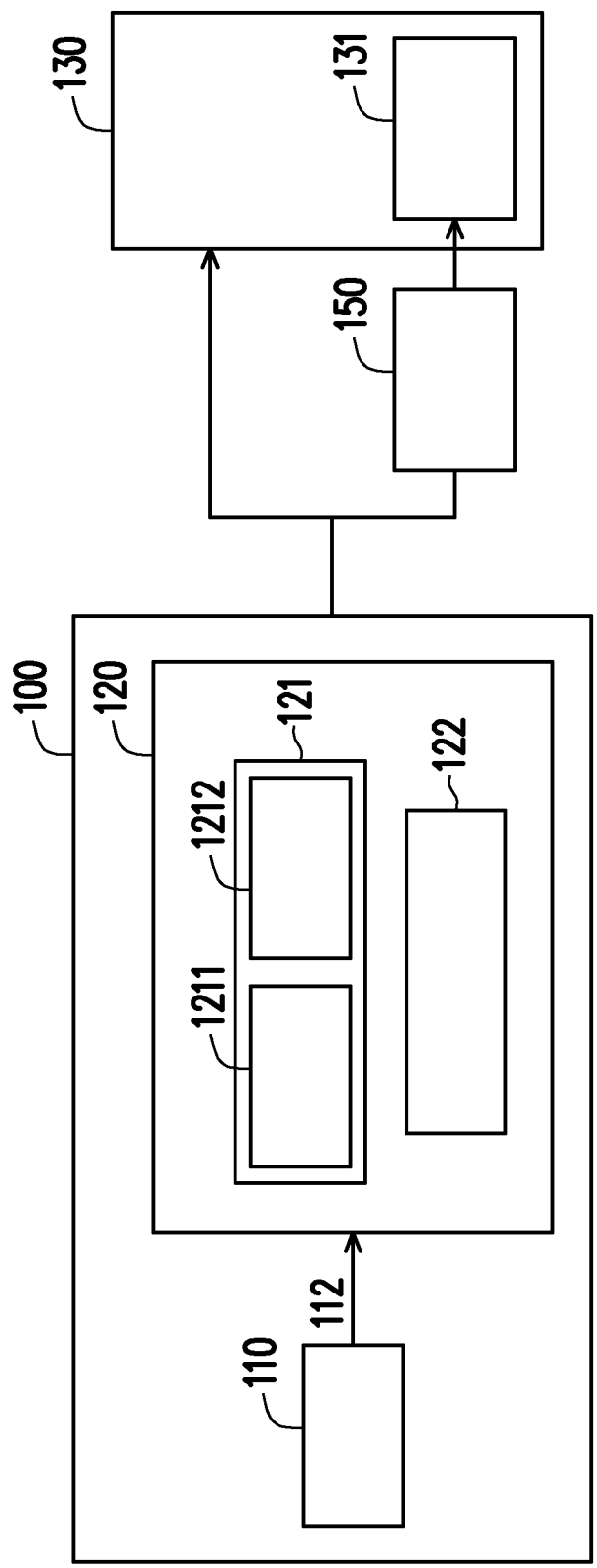
FIG. 1 is a block diagram of a 3D image generation system according to the disclosure.

FIG. 1 is a block diagram of a 3D image generation system of the disclosure. With reference to FIG. 1, the 3D image generation system includes an image processing device 100 and a display device 130 coupled to the image processing device 100. The image processing device 100 includes an image generation circuit 110 and a multifocal length processing circuit 120. The display device 130 may include a zoom lens 131 and a display panel (not shown). In particular, the image generation circuit 110 and the multi-focal length processing circuit 120 may be disposed in different devices. For example, the image generation circuit 110 may be installed in an audio-visual equipment (for example, a host or a computer), and the multifocal length processing circuit 120 may be attached to or disposed in a display device (for example, a display screen, a mobile device, or a head-mounted display device), but the disclosure is not limited thereto. When a 3D image is to be displayed, the image generation circuit 110 may generate multiple depth plane images with depth information, and generate multiple zoom control information respectively corresponding to the multiple depth plane images. The image generation circuit 110 may dynamically determine a image effect (2D or 3D image) to be displayed, number of the depth plane images, and a image transmission manner (simultaneously transmitting multiple depth plane images sets, or only one depth plane images set for every frame of the image) according to a real-time status of the system (such as a display resolution, or a frame rate) and user context. The image generation circuit 110 may merge the multiple depth plane images and the multiple zoom control information according to a specific arrangement rule, so as to generate a merged image data.

Furthermore, the image generation circuit 110 may generate the multiple depth plane images. The image generation circuit 110 may also merge the multiple depth plane images according to a specific arrangement rule, so as to generate a merged image data 112. In particular, the arrangement rule is related to resolution of an image to be displayed. Under a limitation of fixed and limited transmission bandwidth, when the display image is a low-resolution image, a maximum number of focal length layers of the low-resolution image that may be presented is greater (for example, 4 layers of depth information), and when the display image is a high-resolution image, a maximum number of focal length layers of the high-resolution image that may be presented is lesser (for example, 2 layers of depth information). Simply put, when the system wants to display more depth information, it may adopt a low-resolution mode. When the system wants to display a high-resolution and fine-quality image (for example, an indoor scene), then a high-resolution mode with lesser focal length layers may be chosen.

Under the limitation of fixed and limited display transmission bandwidth, Table (1) shows number of depth information layers, total number of input bits per frame for a single viewing angle, frame rate, resolution, field of view (FOV, width*height*distance), and transmission bandwidth corresponding to the disclosure in the low-resolution mode and the high-resolution mode. The transmission bandwidth is the product of the total number of input bits per frame, the frame rate, the viewing angle factor (left eye and right eye) and the color factor (RGB).

TABLE (I)

| | High-resolution mode | Low-resolution mode |
|---|---|---|
| Depth information layers | 2 | 4 |
| Total number of input bits per frame for a single viewing angle (bytes) | 8,294,400 | 7,372,800 |
| Frame rate (frame/sec) | 120 | 240 |
| Resolution | 1920*1080 | 1280*720 |
| Field of view (cm*cm*cm) | 43.8*24.1*50.0 | 29.2*16.1*33.3 |
| Transmission bandwidth (bps) | 5,971,968,000 | 5,308,416,000 |

Figure 2A:
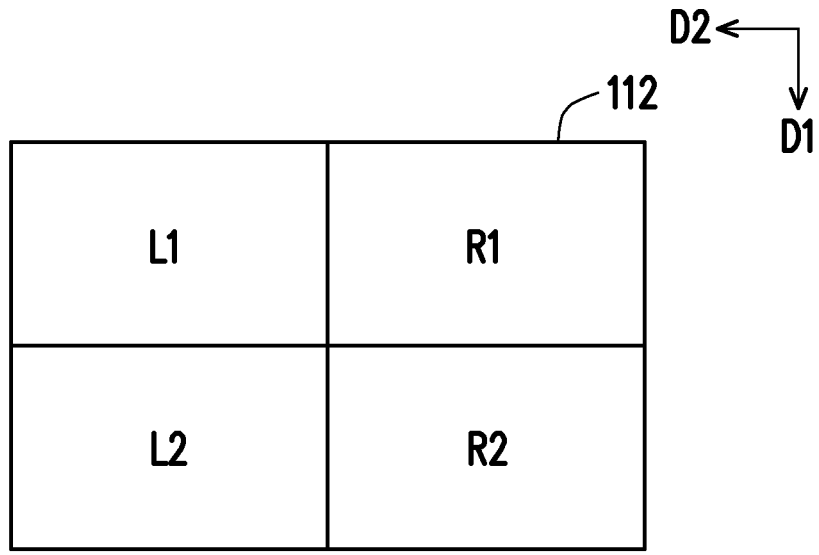
FIG. 2A is a schematic diagram of performing a merging action according to a first arrangement rule.

The disclosure respectively designs a first arrangement rule and a second arrangement rule for the high-resolution mode and the low-resolution mode. The image generation circuit 110 and the multifocal length processing circuit 120 may respectively generate the merged image data and decompose the merged image data according to the first arrangement rule and the second arrangement rule when the image processing device 100 is operating in the high-resolution mode or the low-resolution mode. FIG. 2A is a schematic diagram of performing a merging action according to the first arrangement rule. With reference to FIGS. 1 and 2A concurrently, in the high-resolution mode, the depth plane images that form the merged image data 112 include left-eye depth plane images L1 and L2, and right-eye depth plane images R1 and R2. The left-eye depth plane image L1 and the right-eye depth plane image R1 are a depth plane images set. The left-eye depth plane image L2 and the right-eye depth plane image R2 are another depth plane images set. The left-eye depth plane image and the right-eye depth plane image in each of the depth plane images sets are transmitted to the display device 130 in a same time period. In the high-resolution mode, the image generation circuit 110 may incorporate the zoom control information for the zoom lens 131 into each of the depth plane images sets (for example, the left-eye depth plane image and the right-eye depth plane image). Compared with the conventional technology that transmits the depth plane image and the zoom control information separately, the disclosure incorporates the zoom control information into the depth plane image, thereby ensuring synchronization and accuracy of data transmission.

In an embodiment, before the zoom control information is embedded, the image generation circuit 110 may calculate a corresponding error correction code according to the zoom control information, and perform encoding on the zoom control information and the corresponding error correction code, so as to be incorporated into the corresponding merged image data, therefore generating an encoded control information to increase error tolerance of the zoom control information. For example, the error correction code used by the image generation circuit 110 is BCH codes (Bose-Chaudhuri-Hocquenghem codes), so that multiple random errors of the zoom control information may be detected and corrected when the multifocal length processing circuit 120 performs decoding subsequently.

In the embodiment, the image generation circuit 110 may embed the zoom control information (or the encoded control information) into the least significant bit (LSB) of first few pixels of the corresponding depth plane image, or lowest two bits of first few pixels of the corresponding depth plane image, thereby merging the depth plane images and the zoom control information. For example, assuming that each pixel is 8 bits, the image generation circuit 110 may embed the zoom control information into the lowest two bits (that is, change bit value of the lowest two bits) of the 8 bits, while the other bit values remain unchanged. It should be noted that although a portion of the bit values of the pixels is changed and is different from the original overall bit value, the display effect produced by this difference is barely noticeable by human eye. Moreover, in other embodiments, the zoom control information may be embedded into a vertical blank interval between the depth plane images. In addition, information instructing arrangement rule, index information of the image, image display depth information, or other control signals may also be embedded in the vertical blank interval.

In addition, it should be noted that FIG. 2A only illustrates the first arrangement rule of an embodiment, but the disclosure is not limited thereto. In other embodiments, the first arrangement rule may also be a position exchange between the right-eye depth plane image and the left-eye depth plane image. As long as merging and subsequent restorations adopt the same arrangement rule, regardless of the arrangement manner, they all fall within the scope of the disclosure.

Figure 2B:
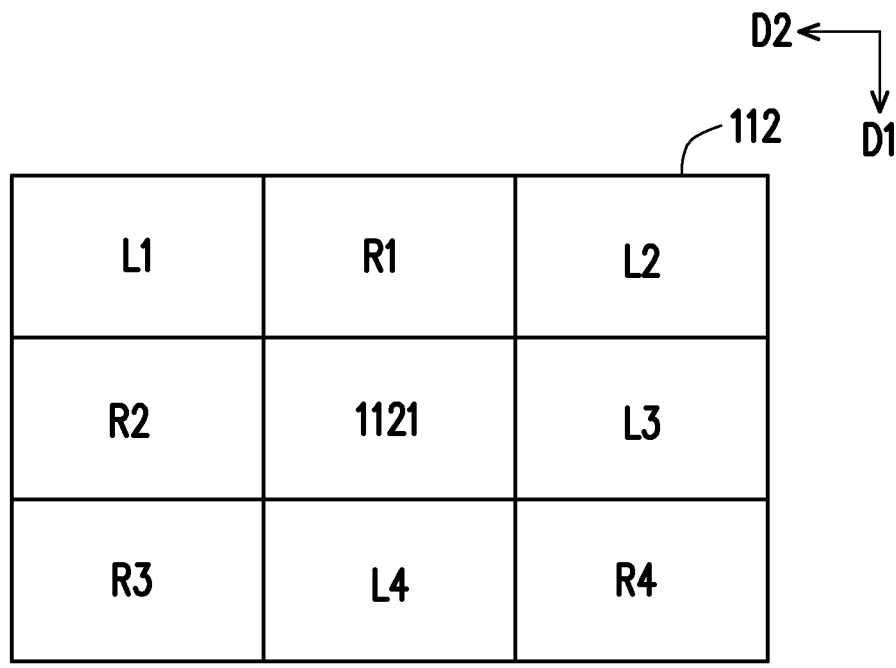
FIG. 2B is a schematic diagram of performing a merging action according to a second arrangement rule.

FIG. 2B is a schematic diagram of performing a merging action according to the second arrangement rule. With reference to FIGS. 1 and 2B concurrently, in the low-resolution mode, the depth plane images that form the merged image data 112 include left-eye depth plane images L1, L2, L3, and L4, and right-eye depth plane images R1, R2, R3, and R4. The left-eye depth plane image L1 and the right-eye depth plane image R1 are a depth plane images set, and grouping of the remaining depth plane images may be deduced by analogy. In the embodiment, multiple depth plane image sets may be transmitted simultaneously in a same time period. In the low-resolution mode, the image generation circuit 110 may also put the zoom control information for the zoom lens 131 into a middle region 1121 to ensure synchronization and accuracy of data transmission. The middle region 1121 is, for example, arranged between two depth plane image sets, and is not used for display purpose. In an embodiment, in addition to putting the zoom control information into the middle region 1121, the image generation circuit 110 may also put information instructing the arrangement rule and basic information of each image (such as information instructing a scene and a position) to the middle region 1121. Moreover, in other embodiments, the vertical blank interval between each of the depth plane images sets may be embedded with related control signals or other index information. Similarly, before the zoom control information is embedded, the image generation circuit 110 may also calculate the error correction code corresponding to the zoom control information, and perform encoding (for example, encode as a BCH code) on the zoom control information and the corresponding error correction code, so as to generate the encoded control information, thereby increasing the error tolerance of the zoom control information. Moreover, the disclosure does not limit the arrangement of the second arrangement rule. As long as merging and subsequent restorations adopt the same arrangement rule, regardless of the arrangement manner, they all fall within the scope of the disclosure. In the embodiment, the image generation circuit 110 may be a device with computing functions to implement the above functions such as a computer, or other types of electronic computing devices.

It should be noted that each depth plane image is transmitted in a time-sharing manner in the conventional technology, and therefore has a higher requirement for accuracy of transmission timing. For example, the left-eye depth plane image L1, the right-eye depth plane image R1, the left-eye depth plane image L2, and the right-eye depth plane image R2 are sequentially transmitted. However, in the disclosure, whether in the high-resolution mode or the low-resolution mode, multiple depth plane images are intended to be transmitted simultaneously. In this way, the disclosure not only has a relatively low requirement for the accuracy of the transmission timing, but also ensures the synchronization and accuracy of data transmission.

With reference to FIG. 1 again, the multifocal length processing circuit 120 of the image processing device 100 is configured to decompose the merged image data 112 according to the foregoing arrangement rules, so as to restore the multiple depth plane images and the multiple zoom control information corresponding to the multiple depth plane images. The multifocal length processing circuit 120 is further configured to determine a time at which the multiple depth plane images which are restored are transmitted to the display device 130, and to determine a time at which the multiple zoom control information which are restored are transmitted to the zoom lens 131 in the display device 130, according to the frame rate of the display device 130.

In detail, the multifocal length processing circuit 120 may include a display image processing circuit 121 and a multifocal length display driving circuit 122. The display image processing circuit 121 is configured to receive the merged image data 112 transmitted by the image generation circuit 110, and to segmentalize the merged image data 112 according to a specific arrangement rule (such as the first arrangement rule or the second arrangement rule), so as to obtain the multiple depth plane images and the multiple zoom control information. The display image processing circuit 121 may further include a segmentation circuit 1211 and a re-timer module (not shown). The multifocal length display driving circuit 122 is configured to simultaneously transmit two depth plane images in a same set to the display device 130, and simultaneously transmit two zoom control information corresponding to the two depth plane images to the zoom lens 131.

Figure 3A:
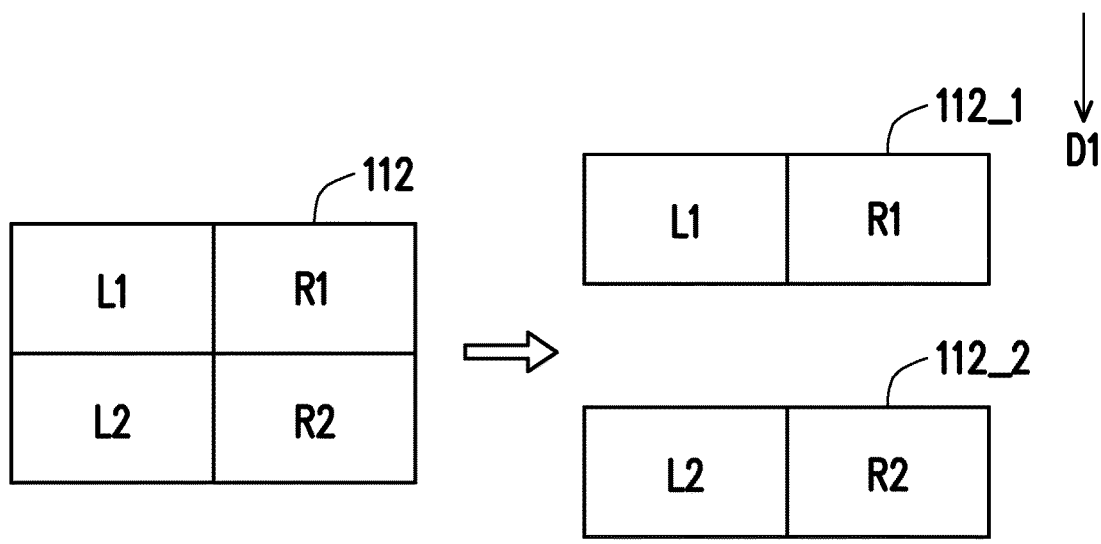
FIG. 3A is a schematic diagram of performing a segmentalizing action according to a first arrangement rule.
Figure 3B:
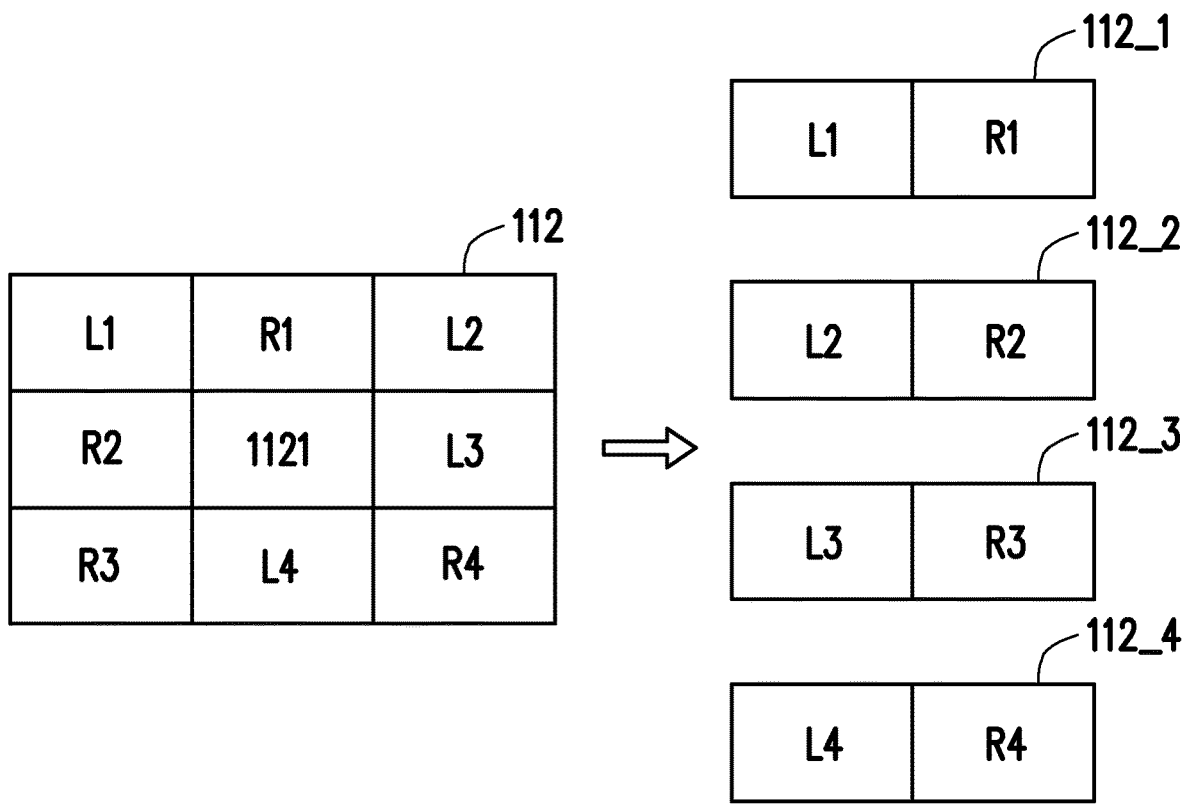
FIG. 3B is a schematic diagram of performing a segmentalizing action according to a second arrangement rule.

FIG. 3A is a schematic diagram of performing a segmentalizing action according to the first arrangement rule. FIG. 3B is a schematic diagram of performing a segmentalizing action according to the second arrangement rule. With reference to FIGS. 1 and 3A concurrently, in the high-resolution mode, the segmentation circuit 1211 is configured to segmentalize the merged image data 112 into two equal parts in a direction D1 and into two equal parts in a direction D2, so as to obtain four depth plane images, which are arranged into two depth plane images sets 112_1 and 112_2 (each depth plane image set includes a left-eye depth plane image and a right-eye depth plane image) according to their arrangement sequence. The direction D1 is, for example, a vertical scanning direction, and the direction D2 is, for example, a horizontal scanning direction. Then, the multifocal length processing circuit 120 may obtain the corresponding zoom control information or the coded control information from at least one lowest bit value (or its vertical blank interval) of a portion of the pixels of the four depth plane images that have been segmentalized.

With reference to FIGS. 1 and 3B concurrently, in the low-resolution mode, the segmentation circuit 1211 is configured to segmentalize the merged image data 112 into three equal parts in the direction D1 and into three equal parts in the direction D2, so as to obtain information of eight depth plane images and the middle region 1121, which are arranged into four depth plane images sets 112_1 to 112_4 according to their arrangement sequence. Then, the multifocal length processing circuit 120 may obtain the zoom control information or the encoded control information from the middle region 1121 according to the depth plane images which are segmentalized. In an embodiment, the display image processing circuit 121 is configured to perform decoding on the multiple encoded control information (such as BCH codes) in the merged image data 112, so as to perform error detection and correction according to a decoding result.

The re-timer module of the display image processing circuit 121 is configured to determine the time at which the multiple depth plane images which are restored are transmitted to the display device 130, and to determine the time at which the multiple zoom control information which are restored are transmitted to the zoom lens 131 in the display device 130, according to the frame rate of the display device 130. For example, a display time length allocated to a image is 33.3 ms when the frame rate of the display device 130 is set to display 30 images per second. The re-timer module may determine a specific time at which the depth plane image is transmitted to the multifocal length display driving circuit 122 according to this value. The re-timer module may simultaneously transfer the zoom control information corresponding to the depth plane image to a corresponding driver (not shown) at the specific time. The multifocal length display driving circuit 122 then sends a driving signal to the display device 130 according to the received depth plane image.

In an embodiment, the display image processing circuit 121 may further include a dynamic prediction module 1212 (see FIG. 1). When an abnormality occurs in the depth plane image that is to be transmitted to the display device 130, such as an abnormality in the BCH decoding (for example, an uncorrectable error in the zoom control information after decoding, resulting in the image not being able to be displayed normally), or the transmission is interrupted, the dynamic prediction module 1212 may perform a prediction according to multiple previous depth plane images and a pre-built prediction model (such as a neural network model), so as to generate a prediction result (such as a connection image), and provide it to the display device 130 to replace the abnormal depth plane image. In this way, a user may see a continuous and normal display image. The foregoing multiple previous depth plane images refer to previously correctly decoded depth plane images (for example, may be stored in a register), and the foregoing neural network model may be pre-built through deep learning. The neural network model is, for example, a recurrent neural network (RNN).

Figure 4:
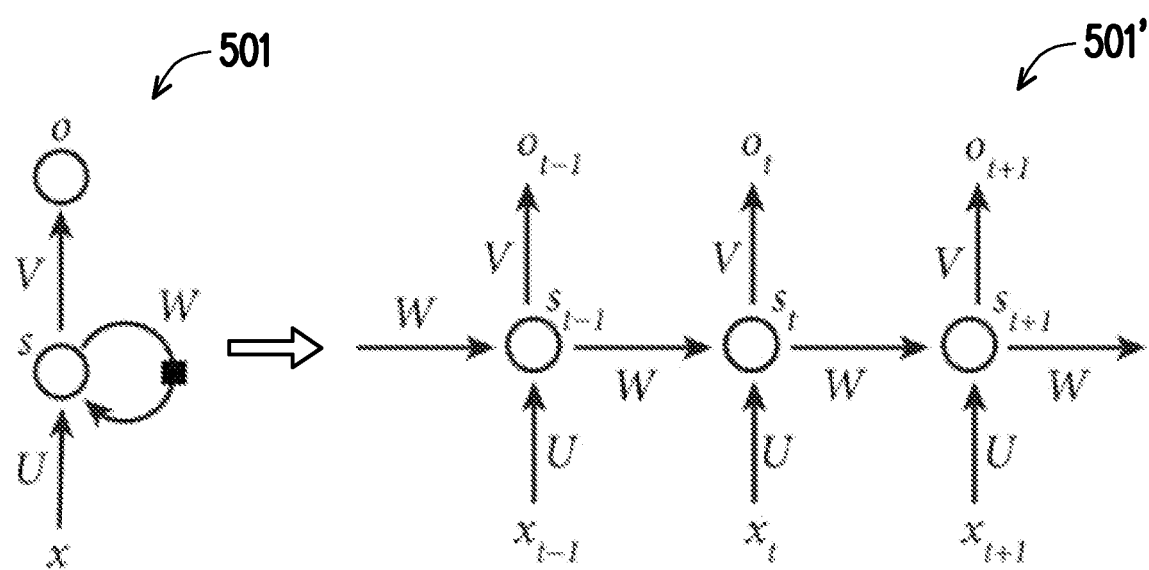
FIG. 4 shows a schematic diagram of a RNN model.

FIG. 4 shows a schematic diagram of the RNN model. With reference to FIG. 4, a model 501 is expanded into a model 501' according to a time sequence, where x represents input information at a certain time, s represents a hidden state (equivalent to a network memory), o represents output information, W represents a weight value, and t, t−1, and t+1 all represent times. It may be seen from FIG. 4 that a final result Ot+1 generated at a time t+1 is a result of interaction of input at the time t+1 and all historical inputs. The RNN model used in the disclosure is a related neural network model familiar to those skilled in the art, and is not particularly limited by the disclosure. The dynamic prediction module 1212 in FIG. 1 may use characteristics of the RNN model to allow previous depth plane images in a buffer to serve as inputs at different times, and output a predicted image through the RNN model. The dynamic prediction module 1212 may appropriately report a prompt message to a system exception handling program when the transmission error continues to occur for a period of time without improvement. In the embodiment, the multifocal length processing circuit 120 may be a field programmable gate array (FPGA) in a display card of a computer. However, the disclosure is not limited thereto. In another embodiment, the multifocal length processing circuit 120 may be a customized integrated circuit (ASIC).

Furthermore, in the embodiment, the display device 130 is configured to display the depth plane images which are restored. Specifically, the display panel (not shown) of the display device 130 may be an OLED panel or other self-luminous display panels. The zoom lens 131 is configured to control a focal length of the lens according to the multiple zoom control information which are restored. The display panel may include a time sequence controller, a source driver, a gate driver, and a pixel array. The display panel is configured to sequentially display the depth plane images which are segmentalized.

In an embodiment, the 3D image generation system may further include a driver 150, configured to perform action on the zoom lens 131 according to the multiple zoom control information. Specifically, the driver 150 may include a microcontroller (not shown) and a PZT driver (not shown) composed of lead zirconate titanate (PZT) piezoelectric ceramics. The microcontroller is configured to receive the multiple zoom control information which are restored from the multifocal length processing circuit 120. The microcontroller controls the PZT driver according to the multiple zoom control information, so that the PZT driver may drive the zoom lens 131. It should be noted that the driver 150 may be disposed independently or be integrated with the display device 130, and is not particularly limited by the disclosure.

Figure 5:
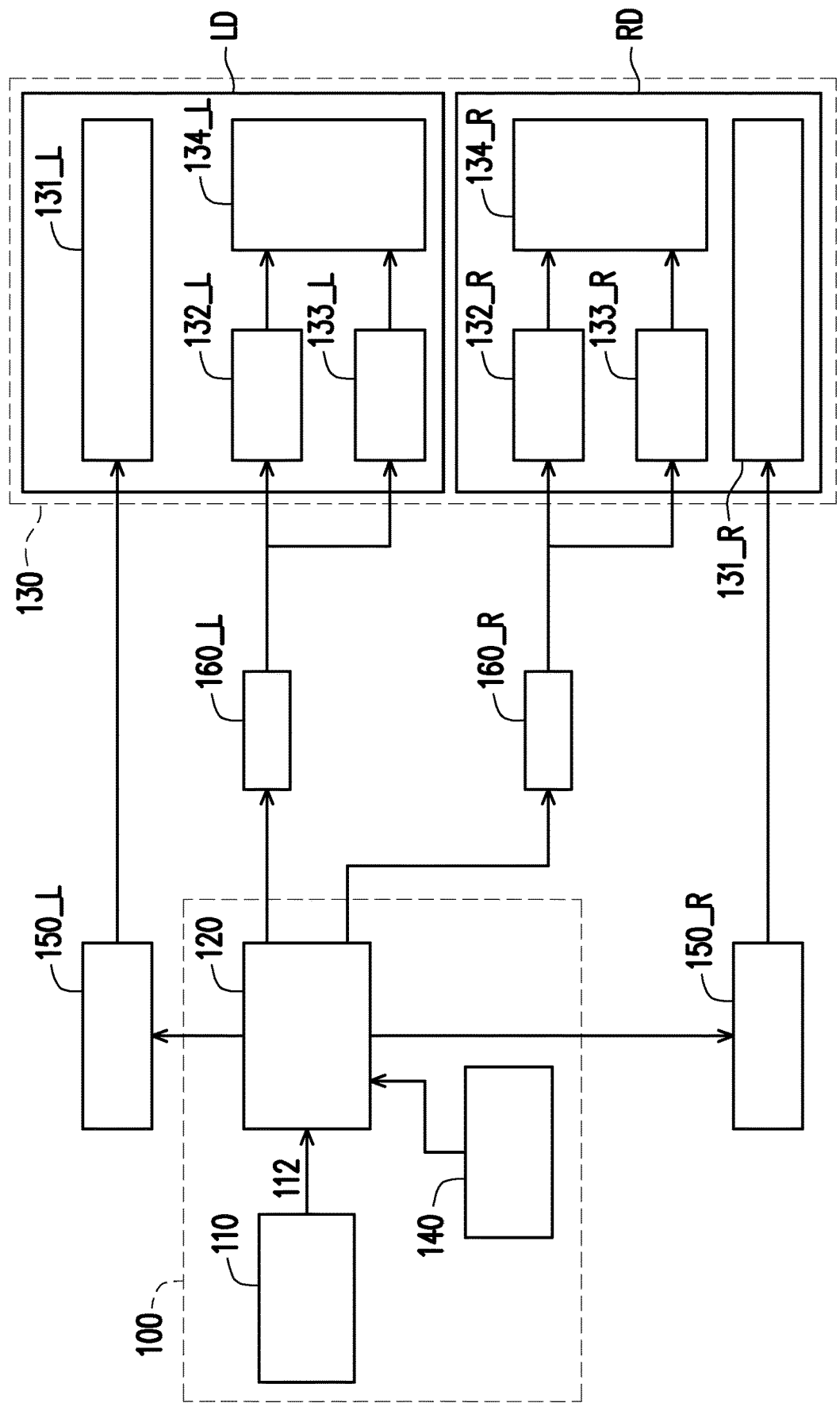
FIG. 5 is a block diagram of a 3D image generation system according to another embodiment of the disclosure.

FIG. 5 is a block diagram of a 3D image generation system according to another embodiment of the disclosure. The 3D image generation system in FIG. 5 is, for example, a head-mounted display device. Reference may be made to the description of the foregoing elements with the same names for related descriptions of elements in FIG. 5, which are not repeated here. Compared with the driver 150 in FIG. 1, the driver in FIG. 5 comprises drivers 150_L and 150_R for the left-eye display device LD and the right-eye display device RD respectively. The zoom lens in FIG. 5 comprises zoom lenses 131_L and 131_R for the left-eye display device LD and the right-eye display device RD respectively. The display panel in FIG. 5 comprises display panels 134_L and 134_R for the left-eye display device LD and the right-eye display device RD respectively. In addition, the 3D image generation system of the embodiment may further optionally include a resolution mode selector 140, a rotating plate 160_L for the left-eye display device LD, and a rotating plate 160_R for the right-eye display device RD, a controller 132_L, a controller 132_R, a controller 133_L, and a controller 133_R.

The resolution mode selector 140 may provide information instructing a current resolution mode to the multifocal length processing circuit 120, so that the resolution mode selector 140 may know whether current operation is in the high-resolution mode or the low-resolution mode. The rotating plates 160_L and 160_R are configured to convert image format, and the rotating plates 160_L and 160_R do not need to be disposed when there is no such requirement. In addition, image transmission interfaces of the left-eye display device LD and the right-eye display device RD may be interfaces that comply with mipi, HDMI, DP, USB, VGA, or DVI specifications, or other types of image transmission interfaces other than the above types. The controllers 132_L, 132_R, 133_L, and 133_R may, for example, provide a transmission channel respectively matching the rotating plates 160_L and 160_R, and may match with the above-mentioned image transmission interfaces, which are configured to control the display panel 134_L and the display panel 134_R to display the depth plane images.

Figure 6:
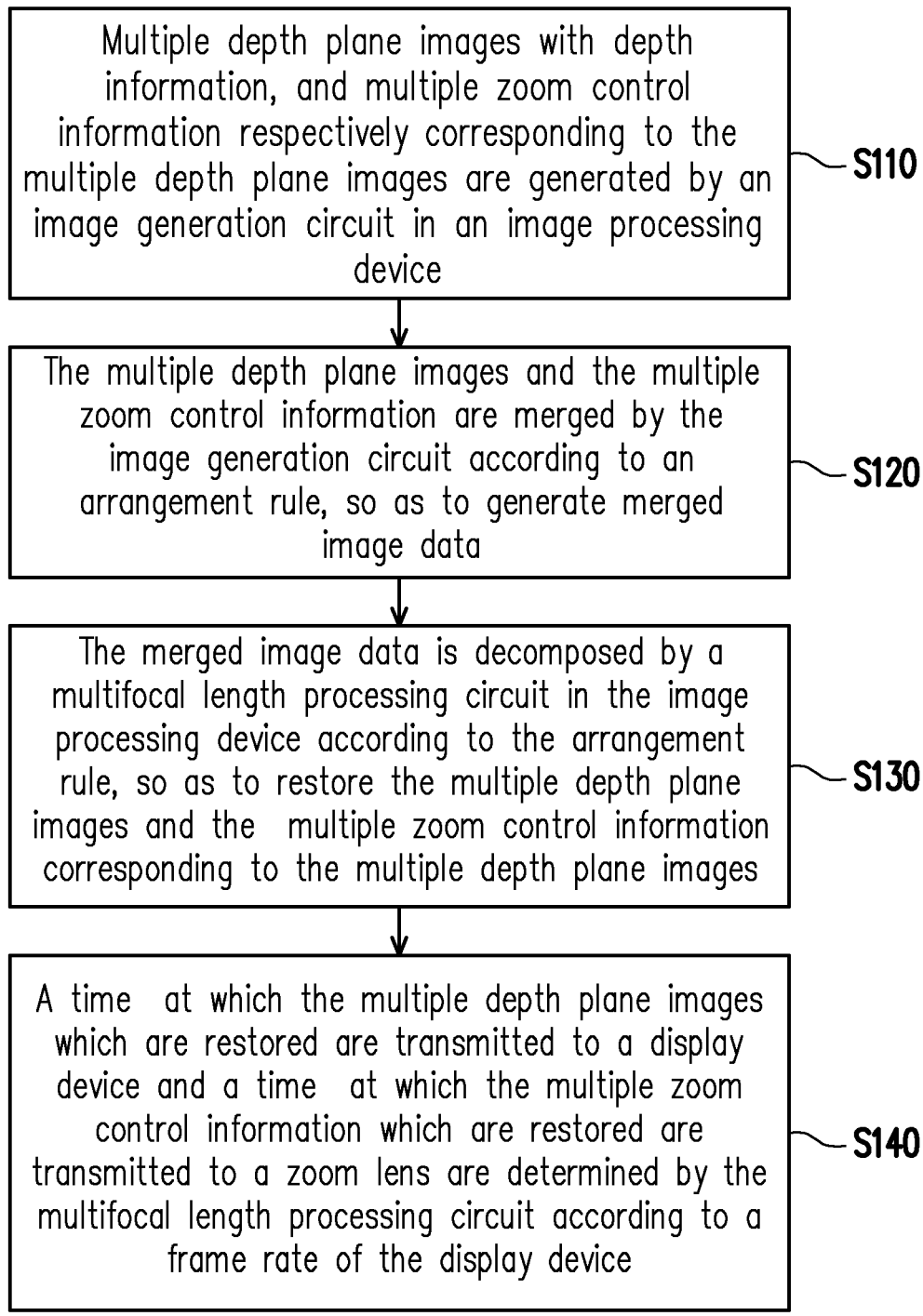
FIG. 6 is a flowchart showing steps of an image processing method of the disclosure.

FIG. 6 is a flowchart showing steps of an image processing method of the disclosure. With reference to FIGS. 1 and 6 concurrently, in Step S110, the multiple depth plane images with depth information, and the multiple zoom control information respectively corresponding to the multiple depth plane images are generated by the image generation circuit 110 in the image processing device 100. In Step S120, the multiple depth plane images and the multiple zoom control information are merged by the image generation circuit 110 according to the arrangement rule, so as to generate the merged image data. In Step S130, the merged image data is decomposed by the multifocal length processing circuit 120 in the image processing device 100 according to the arrangement rule, so as to restore the multiple depth plane images and the multiple zoom control information corresponding to the multiple depth plane images. In Step S140, the time at which the multiple depth plane images which are restored are transmitted to the display device 130 and the time at which the multiple zoom control information which are restored are transmitted to the zoom lens 131 are determined by the multifocal length processing circuit 120 according to the frame rate of the display device 130.

In summary, the embodiments of the disclosure have at least one of the following advantages. In the disclosure, the merged image data containing the multiple depth plane images and the multiple zoom control information corresponding to the multiple depth plane images are transmitted by the image generation circuit, and the merged image data is decomposed through the multifocal length processing circuit, so as to obtain the multiple depth plane images and the multiple zoom control information corresponding to the multiple depth plane images. Since the multiple depth plane images and the multiple zoom control information corresponding to the multiple depth plane images are transmitted one-time, the disclosure can prevent the transmitted data content from being incorrect due to factors such as the processing speed and the transmission rate. At the same time, the disclosure can also accurately determine the time at which each of the depth plane images is transmitted to the display device and each of the zoom control information is transmitted to the zoom lens, so as to ensure the fluency of the image.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the invention", "the present invention" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An image processing device, coupled to a display device comprising a zoom lens, the image processing device comprising:
   an image generation circuit, configured to generate a plurality of depth plane images with depth information, and a plurality of zoom control information respectively corresponding to the plurality of depth plane images, wherein the image generation circuit merges the plurality of depth plane images and the plurality of zoom control information according to an arrangement rule, so as to generate a merged image data; and
   a multifocal length processing circuit, configured to decompose the merged image data according to the arrangement rule, so as to restore the plurality of depth plane images and the plurality of zoom control information corresponding to the plurality of depth plane images,
   wherein the multifocal length processing circuit is further configured to determine a time at which the plurality of depth plane images which are restored are transmitted to the display device and a time at which the plurality of zoom control information which are restored are transmitted to the zoom lens according to a frame rate of the display device.

2. The image processing device according to claim 1, wherein the image generation circuit and the multifocal length processing circuit generate the merged image data and decompose the merged image data according to a first arrangement rule when the image processing device is operating in a high-resolution mode, and the image generation circuit and the multifocal length processing circuit generate the merged image data and decompose the merged image data according to a second arrangement rule when the image processing device is operating in a low-resolution mode.

3. The image processing device according to claim 1, wherein the image generation circuit is configured to merge two sets of depth planes images with different depth information when the image processing device is operating in a high-resolution mode, wherein each set of the two sets of depth plane images comprises two depth plane images respectively corresponding to a left eye and a right eye.

4. The image processing device according to claim 1, wherein the image generation circuit is configured to merge four sets of depth planes images with different depth information when the image processing device is operating in a low-resolution mode, wherein each set of the four sets of depth plane images comprises two depth plane images respectively corresponding to a left eye and a right eye.

5. The image processing device according to claim 1, wherein the image generation circuit is configured to replace at least one least significant bit of a portion of pixels of each of the depth plane images with zoom control information corresponding to each of the depth plane images, thereby merging the plurality of depth plane images and the plurality of zoom control information.

6. The image processing device according to claim 1, wherein the image generation circuit is configured to write the plurality of zoom control information into a vertical blank interval between the plurality of depth plane images, thereby merging the plurality of depth plane images and the plurality of zoom control information.

7. The image processing device according to claim 1, wherein the image generation circuit is configured to respectively calculate a plurality of error correction codes corresponding to the plurality of zoom control information according to the plurality of zoom control information, so as to incorporate the plurality of error correction codes into the merged image data, and the multifocal length processing circuit is configured to respectively perform error correction on the plurality of zoom control information which are restored according to the plurality of error correction codes after decomposing the merged image data, so as to ensure correctness of the plurality of zoom control information which are restored.

8. The image processing device according to claim 7, wherein the plurality of error correction codes are BCH codes.

9. The image processing device according to claim 1, wherein the multifocal length processing circuit comprises a segmentation circuit, the segmentation circuit is configured to segmentalize the merged image data into N equal parts in a vertical scanning direction and segmentalize the merged image data into M equal parts in a horizontal scanning direction according to the arrangement rule, so as to restore the plurality of depth plane images and the plurality of zoom control information corresponding to the plurality of depth plane images, wherein both N and M are natural numbers.

10. The image processing device according to claim 1, wherein the multifocal length processing circuit comprises a dynamic prediction module, a prediction is performed on N depth plane images before an abnormal depth plane image in a transmission sequence according to a pre-built prediction model when the abnormal depth plane image that is to be transmitted to the display device, and the abnormal depth plane image is replaced with a prediction result and the prediction result is transmitted to the display device.

11. An image processing method, suitable for an image processing device, wherein the image processing device is coupled to a display device comprising a zoom lens, the image processing method comprising:
generating a plurality of depth plane images with depth information and a plurality of zoom control information respectively corresponding to the plurality of depth plane images by an image generation circuit in the image processing device;
merging the plurality of depth plane images and the plurality of zoom control information by the image generation circuit according to an arrangement rule, so as to generate merged image data;
decomposing the merged image data by a multifocal length processing circuit in the image processing device according to the arrangement rule, so as to restore the plurality of depth plane images and the plurality of zoom control information corresponding to the plurality of depth plane images; and
determining a time at which the plurality of depth plane images which are restored are transmitted to the display device and a time at which the plurality of zoom control information which are restored are transmitted to the zoom lens by the multifocal length processing circuit according to a frame rate of the display device.

12. The image processing method according to claim 11, further comprising:
enabling the image generation circuit and the multifocal length processing circuit to generate the merged image data and decompose the merged image data according to a first arrangement rule when the image processing device is operating in a high-resolution mode; and
enabling the image generation circuit and the multifocal length processing circuit to generate the merged image data and decompose the merged image data according to a second arrangement rule when the image processing device is operating in a low-resolution mode.

13. The image processing method according to claim 11, further comprising:
merging two sets of depth plane images with different depth information by the image generation circuit when the image processing device is operating in a high-resolution mode, wherein each set of the two sets of depth plane images comprises two depth plane images respectively corresponding to a left eye and a right eye.

14. The image processing method according to claim 11, further comprising:
merging four sets of depth planes images with different depth information by the image generation circuit when the image processing device is operating in a low-resolution mode, wherein each set of the four sets of depth plane images comprises two depth plane images respectively corresponding to a left eye and a right eye.

15. The image processing method according to claim 11, further comprising:
replacing at least one least significant bit of a portion of pixels of each of the depth plane images with zoom control information corresponding to each of the depth plane images by the image generation circuit, thereby merging the plurality of depth plane images and the plurality of zoom control information.

16. The image processing method according to claim 11, further comprising:
writing the plurality of zoom control information into a vertical blank interval between the plurality of depth plane images by the image generation circuit, thereby merging the plurality of depth plane images and the plurality of zoom control information.

17. The image processing method according to claim 11, further comprising:
respectively calculating a plurality of error correction codes corresponding to the plurality of zoom control information by the image generation circuit according to the plurality of zoom control information, so as to be incorporated into the merged image data; and
decomposing the merged image data, and respectively performing error correction on the plurality of zoom control information which are restored by the multifocal length processing circuit according to the plurality of error correction codes, so as to ensure correctness of the plurality of zoom control information which are restored.

18. The image processing method according to claim 17, wherein the plurality of error correction codes are BCH codes.

19. The image processing method according to claim 11, further comprising:

segmentalizing the merged image data into N equal parts in a vertical scanning direction and segmentalizing the merged image data into M equal parts in a horizontal scanning direction by a segmentation circuit in the multifocal length processing circuit according to the arrangement rule, thereby restoring the plurality of depth plane images and the plurality of zoom control information corresponding to the plurality of depth plane images, where N and M are both natural numbers.

20. The image processing method according to claim 11, further comprising:

performing a prediction on N depth plane images before an abnormal depth plane image in a transmission time sequence by a dynamic prediction module in the multifocal length processing circuit according to a pre-built prediction model when the abnormal depth plane image that is to be transmitted to the display device, so as to generate a prediction result; and replacing the abnormal depth plane image with the prediction result and transmitting the prediction result to the display device by the multifocal length processing circuit.

21. A 3D image generation system, comprising:

the image processing device according to claim 1;

a display device, coupled to the image processing device and configured to display the plurality of depth plane images which are restored, wherein the display device comprises:

a zoom lens, coupled to the image processing device and configured to change a focal length according to the plurality of zoom control information which are restored.

22. The 3D image generation system according to claim 21, wherein the plurality of depth plane images which are restored are formed by a plurality of sets of depth plane images with different depth information, each set of depth plane images comprises two depth plane images respectively corresponding to a left eye and a right eye, the multifocal length processing circuit is further configured to simultaneously transmit the two depth plane images in a same set to the display device and simultaneously transmit the two zoom control information corresponding to the two depth plane images in the same set to the zoom lens.

* * * * *